United States Patent [19]

Komori et al.

[11] Patent Number: 5,749,069
[45] Date of Patent: May 5, 1998

[54] PATTERN AND SPEECH RECOGNITION USING ACCUMULATED PARTIAL SCORES FROM A POSTERIORI ODDS, WITH PRUNING BASED ON CALCULATION AMOUNT

[75] Inventors: Takashi Komori; Shigeru Katagiri, both of Kyoto, Japan

[73] Assignee: ATR Human Information Processing Research Laboratories, Kyoto, Japan

[21] Appl. No.: 405,674

[22] Filed: Mar. 17, 1995

[30] Foreign Application Priority Data

Mar. 18, 1994 [JP] Japan ................. 6-48694

[51] Int. Cl.$^6$ ............................. G10L 5/06
[52] U.S. Cl. .................. 704/240; 704/251; 704/252; 704/254
[58] Field of Search ............ 395/20, 2.42, 2.49, 395/2.6, 2.61, 2.63, 2.64

[56] References Cited

U.S. PATENT DOCUMENTS

| | | | |
|---|---|---|---|
| 4,713,778 | 12/1987 | Baker | 395/2 |
| 4,783,803 | 11/1988 | Baker et al. | 395/2.61 |
| 4,811,399 | 3/1989 | Landell et al. | 395/2.62 |
| 4,977,598 | 12/1990 | Doddington et al. | 395/2.64 |
| 5,202,952 | 4/1993 | Gillick | 395/2.09 |
| 5,218,668 | 6/1993 | Higgins et al. | 395/2 |
| 5,241,619 | 8/1993 | Schwartz et al. | 395/2 |
| 5,349,645 | 9/1994 | Zhao | 395/2.52 |

*Primary Examiner*—Allen R. MacDonald
*Assistant Examiner*—Talivaldis Ivars Šmits
*Attorney, Agent, or Firm*—Lowe, Price, LeBlanc & Becker

[57] ABSTRACT

A speech recognition apparatus includes a data input portion to which input data which is a speech pattern is applied, a score calculation portion calculating a score indicating a possibility of recognition of a partial pattern of the speech pattern based on the estimate of a posteriori odds, an optimization design portion designing optimized parameters for calculating the estimate of the a posteriori odds in the score calculation portion and/or optimized parameters of pruning functions controlling calculation amount in the pruning processing portion, a pruning processing portion pruning the score for making operation efficient, an accumulated score calculating portion accumulating pruned scores to calculate an accumulated score, a recognition result decision portion classifying input data for every class based on the accumulated score and deciding a recognition result, and a recognition result output portion providing the recognition result.

30 Claims, 4 Drawing Sheets

PATTERN AND SPEECH RECOGNITION USING ACCUMULATED PARTIAL SCORES FROM A POSTERIORI ODDS, WITH PRUNING BASED ON CALCULATION AMOUNT

BACKGROUND OF THE INVENTION

1. Field of the Invention

The present invention generally relates to a pattern recognition method, a speech recognition method, and a speech recognition apparatus, and more particularly, to a pattern recognition method, a speech recognition method, and a speech recognition apparatus using a posteriori odds.

2. Description of the Background Art

Natural and spontaneous speech utterance does not always follow a grammatical rule. In addition, natural speech often contains a variety of acoustic phenomena such as interjections and tongue-clickings. One desired method for using such natural speech as an input interface to a system is to detect only prescribed key words important to the system from uttered speech together with their locations (word spotting), and to decide the most probable word sequence through a high-level processing such as a syntactic analysis based on the detected result.

One method for word spotting is to calculate any score indicating a degree of matching with respect to a target word for every partial pattern of observed speech and to compare the score with a threshold value to decide a word candidate. In this case, the threshold value was chosen heuristically. Further, since the score of an individual word candidate is normalized so as not to depend on time length of the word for comparison with the threshold value, possibilities of recognition of word sequences different in length cannot be directly compared by simply accumulating word scores. Mainly for this reason, only a conventional word sequence score in this framework based on heuristics was available.

In another method for word spotting, a "garbage class", that is, a class containing every acoustic phenomenon other than target words, is prepared in addition to each class of the target words, and a word sequence is recognized regarding observed speech as uninterrupted continuation of acoustic phenomena of these classes. This method suffers from the same problem as that of a conventional continuous speech recognition. More specifically, an accumulated score must be stored and calculated for every grammatical node at each time. The number of grammatical nodes increases explosively as the grammatical complexity increases, making the calculation impractical. In order to prevent this, a method (beam search) is employed in which a grammatical node having a low accumulated score is rejected during calculation. This beam search is also just one of heuristics.

A strategy common to these methods is to reduce a large amount of calculation for obtaining the most probable word sequence from observed speech by pruning candidates based on empirical knowledge at the sacrifice of theoretical optimality. In this case, even if a score calculation portion and a candidate pruning portion are optimally designed, the entire system will not be optimized, as far as different criteria are used for respective portions. The entire system including the score calculation portion and the candidate pruning portion must be directly optimized by using a single objective function. However, the score calculation portion and the candidate pruning portion were separately designed in a conventional design of a speech recognition apparatus based on word spotting.

In brief, a continuous speech recognition apparatus based on word spotting was structured of two processing mechanisms; pruning of the number of partial hypotheses based on a score and decision of a word sequence according to combinations of the partial hypotheses. Because of the structural complexity, the design was only partially or heuristically optimized. An optimization method of the entire system having a theoretical background was not proposed.

On the other hand, a generalized probabilistic descent method (GPD), which has recently been presented, proposes a framework of optimization according to gradient search of a system including a discontinuous processing such as selection of a minimum value and decision, by employing approximation using a 1st-differentiable continuous function. A learning method for minimizing an error rate in speech classification is proposed as a specific application of the GPD. Further, the GDP is also applied to spotting.

SUMMARY OF THE INVENTION

One object of the present invention is to provide a speech recognition method for, using a score based on the a posteriori odds, which has never been proposed, pruning the number of partial hypotheses based on the score, and deciding a word sequence according to combinations of the partial hypotheses to recognize speech, and a speech recognition apparatus therefore.

Another object of the present invention is to provide a speech recognition method for optimizing the entire system including both a score decision portion and a candidate pruning portion based on the a posteriori odds, and a speech recognition apparatus therefore.

Still another object of the present invention is to provide not only a speech recognition method and a speech recognition apparatus but also a pattern recognition method for, using a score based on the a posteriori odds, pruning the number of partial hypotheses based on the score, and deciding a continuous pattern according to combinations of the partial patterns to recognize the pattern.

In one aspect of the present invention, a pattern recognition method for recognizing a plurality of partial patterns of a continuous pattern to recognize the continuous pattern as a combination of the partial patterns includes the first step of deciding based on an estimate of the a posteriori odds a plurality of physical quantities each indicating a possibility of recognition of each partial pattern and corresponding to each partial pattern, the second step of deciding an accumulated physical quantity indicating a possibility of recognition of a combination of the partial patterns based on each physical quantity, and the third step of classifying the continuous pattern into one of predetermined classes of combination based on the decided accumulated physical quantity.

Therefore, according to the present invention, since possibilities of the plurality of partial patterns forming the continuous pattern are decided according to the physical quantities based on the estimate of the a posteriori odds, and the continuous pattern is recognized based on a possibility of the combination of the partial patterns decided by accumulation of the physical quantities, pattern recognition supported theoretically can be carried out.

In the one aspect of the present invention, the first step includes the step of pruning partial pattern candidates for decision of the accumulated physical quantity or classification of the continuous pattern. Therefore, it is possible to make recognition of the continuous pattern efficient.

In the one aspect of the present invention, the first step includes the step of finding the estimate of the a posteriori odds using a parameter maximizing likelihood of the estimated a posteriori odds for decision of the physical quantity. Therefore, it is possible to optimize recognition of the continuous pattern.

In the one aspect of the present invention, the first step includes the step of representing a classification error rate as a predetermined function and finding the estimate of the a posteriori odds using a parameter minimizing a value of the function for decision of the physical quantity. Therefore, it is possible to optimize recognition of the continuous pattern.

In the one aspect of the present invention, the first step includes the step of representing a classification error rate and a calculation amount as a predetermined function and finding the estimate of the a posteriori odds using a parameter minimizing a value of the function for decision of the physical quantity. Therefore, it is possible to optimize recognition of the continuous pattern.

In the one aspect of the present invention, the first step includes the step of representing a classification error rate as a predetermined function and finding the estimate of the a posteriori odds using a parameter minimizing a value of the function for decision of the physical quantity and pruning of the partial patterns. Therefore, it is possible to optimize recognition of the continuous pattern.

In the one aspect of the present invention, the first step includes the step of representing a classification error rate and a calculation amount as a predetermined function and finding the estimate of the a posteriori odds using a parameter minimizing a value of the function for decision of the physical quantity and pruning of the partial patterns. Therefore, it is possible to optimize recognition of the continuous pattern.

In another aspect of the present invention, a speech recognition method for recognizing a plurality of partial patterns of a time series speech pattern to recognize the speech pattern as a combination of the partial patterns includes the first step of deciding based on an estimate of the a posteriori odds a plurality of scores each indicating a possibility of recognition of each partial pattern and corresponding to each partial pattern, the second step of deciding an accumulated score indicating a possibility of recognition of a combination of the partial patterns based on each score, and the third step of classifying the speech pattern into one of predetermined classes of the combination based on the decided accumulated score.

Therefore, according to the present invention, since possibilities of the plurality of partial patterns forming the speech pattern are decided according to the scores based on the estimate of the a posteriori odds, and the speech pattern is recognized based on a possibility of a combination of the partial patterns decided by accumulation of the scores, speech recognition supported theoretically can be carried out.

In the another aspect of the present invention, the first step includes the step of pruning partial pattern candidates for decision of the accumulated score or classification of the speech pattern. Therefore, it is possible to make recognition of the speech pattern efficient.

In the another aspect of the present invention, the first step includes the step of finding the estimate of the a posteriori odds using a parameter maximizing likelihood of the estimated a posteriori odds for decision of the score. Therefore, it is possible to optimize recognition of the speech pattern.

In the another aspect of the present invention, the first step includes the step of representing a classification error rate as a predetermined function and finding the estimate of the a posteriori odds using a parameter minimizing a value of the function for decision of the score. Therefore, it is possible to optimize recognition of the speech pattern.

In the another aspect of the present invention, the first step includes the step of representing a classification error rate and a calculation amount as a predetermined function and finding the estimate of the a posteriori odds using a parameter minimizing a value of the function for decision of the score. Therefore, it is possible to optimize recognition of the speech pattern.

In the another aspect of the present invention, the first step includes the step of representing a classification error rate as a predetermined function and finding the estimate of the a posteriori odds using a parameter minimizing a value of the function for decision of the score and pruning of the partial pattern candidates. Therefore, it is possible to optimize recognition of the speech pattern.

In the another aspect of the present invention, the first step includes the step of representing a classification error rate and a calculation amount as a predetermined function and finding the estimate of the a posteriori odds using a parameter minimizing a value of the function for decision of the score and pruning of the partial pattern candidates. Therefore, it is possible to optimize recognition of the speech pattern.

In still another aspect of the present invention, a speech recognition apparatus for recognizing a plurality of partial patterns of a time series speech pattern to recognize the speech pattern as a combination of the partial patterns includes a score decision portion for deciding based on an estimate of the a posteriori odds a plurality of scores each indicating a possibility of recognition of each partial pattern and corresponding to each partial pattern, an accumulated score decision portion for deciding an accumulated score indicating a possibility of recognition of a combination of the partial patterns based on each score, and a classification portion for classifying the speech pattern into one of predetermined classes of combination based on the decided accumulated score.

Therefore, according to the present invention, since possibilities of recognition of the plurality of partial patterns included in the speech pattern are decided by the scores based on the estimate of the a posteriori odds, and the speech pattern is recognized based on a possibility of a combination of the partial patterns decided by accumulation of the scores, a speech recognition apparatus can be provided which can carry out speech recognition supported theoretically.

In the still another aspect of the present invention, the speech recognition apparatus further includes a pruning portion for pruning partial pattern candidates for decision of the score or classification of the speech pattern. Therefore, it is possible to make recognition of the speech pattern efficient.

In the still anther aspect of the present invention, the speech recognition apparatus further includes an optimization portion for optimizing the estimated a posteriori odds using a parameter maximizing likelihood of the estimate of the a posteriori odds for decision of the score. Therefore, it is possible to optimize recognition of the speech pattern.

In the still another aspect of the present invention, the speech recognition apparatus further includes an optimization portion for representing a classification error rate as a predetermined function and optimizing the estimate of the a posteriori odds using a parameter minimizing a value of the function for decision of the score. Therefore, it is possible to optimize recognition of the speech pattern.

In the still another aspect of the present invention, the speech recognition apparatus further includes an optimization portion for representing a classification error rate and a calculation amount as a predetermined function and optimizing the estimate of the a posteriori odds using a parameter minimizing a value of the function for decision of the score. Therefore, it is possible to optimize recognition of the speech pattern.

In the still another aspect of the present invention, the speech recognition apparatus further includes an optimization portion for representing a classification error rate as a predetermined function and optimizing the estimate of the a posteriori odds using a parameter minimizing a value of the function for decision of the score and pruning of the partial pattern candidates. Therefore, it is possible to optimize recognition of the speech pattern.

In the still another aspect of the present invention, the speech recognition apparatus further includes an optimization portion for representing a classification error rate and a calculation amount as a predetermined function and optimizing the estimate of the a posteriori odds using a parameter minimizing a value of the function for decision of the score and pruning of the partial pattern candidates. Therefore, it is possible to optimize recognition of the speech pattern.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Before describing embodiments of the present invention with reference to the drawings, the present invention will be conceptually described. Since a speech recognition apparatus by word spotting is considered to recognize speech based on combination decisions of individual word candidates, formulation of a mechanism for solving a general combination decision problem will first be described. Secondly, a design criterion based on maximum likelihood estimation, a minimum decision combination error, and the minimum decision combination error to which a minimum calculating amount is added will be described as an optimization design method. Thirdly, a speech recognition apparatus will be described with reference to the drawings.

Formulation of Decision Combination Mechanism 1.1 Decision mechanism based on logarithmic a posteriori odds Description will be given of a decision mechanism in which a decision a is made based on an obtained evidence x. Assume that a set of decisions which may be selected is $A\dagger$ ($\dagger$ is to be attached to a set to be represented in a calligraphic character hereinafter)=$\{\alpha_j\}_{j=1}^{J}$. Since respective $\alpha_j$ are not always exclusive with each other in general, a plurality of decisions may be made from the evidence x, or no decision may be made from the evidence x. In such a case, not $a \in A\dagger$, but $a \in P\dagger \subseteq p\dagger(A\dagger)$, wherein $p\dagger(A\dagger)$ is a power set of $A\dagger$, indicating that a plurality of decisions are made in the case of $|a|>1$, and that no decision is made in the case of $a=\Phi$ ($\Phi$ is a null set).

Since decisions partially exclusive with each other may be made, $P\dagger$ is a subset of $p\dagger$ ($A\dagger$) in general.

When a posteriori probability Pr (a|x) of the decision a based on the obtained evidence x is given, if a* according to Bayesian decision rule, that is, according to the expression (1), is selected, a decision error is minimized. Assuming that a posteriori probabilities $Pr(\alpha_j|x)$ at which respective decisions $\alpha_j$ are made when the evidence x is obtained are independent from each other, the expression (2) holds. It should be noted that $1(\cdot)$ is a two-valued function which takes 1 and 0 when a logical expression within parentheses is a true value and a false value, respectively.

It should be noted also that $1(\cdot)$ can also be a two-valued function represented by the equation (36) The two definitions of this function is distinguished by its argument; whether the argument is a logical expression or a numerical-valued expression.

Here, a* can be obtained even in such a state as shown in the expression (5) using scores $S_a(x)$ by logarithm of a ratio of the a posteriori probabilities of the decision a to a decision $\Phi$ as represented by the expressions (3) and (4). In the expression (4), if $Pr(\alpha_j|x)/(1-Pr(\alpha_j|x))$ is defined as represented by the expression (6), $O(\alpha_j|x)$ is an amount, which is called a posteriori odds, indicating a possibility of recognition of the decision $\alpha_j$ based on the evidence x. The expression (5) indicates that a possibility of recognition of the decision a is estimated by a sum of the logarithmic a posteriori odds of individual decisions $\alpha_j \in a$, and that the best decision a* can be made by searching for the maximum value.

Based on the above, description will now be given of a decision mechanism in which a decision is made by comparison of the estimates of score $S_a(x)$ obtained by a sum of the logarithmic a posteriori odds. More specifically, when the estimates of the logarithmic a posteriori odds $\ln O(\alpha_j|x)$ are obtained as $\eta_j(x;\Lambda)$ by a parameter set $\Lambda$ of the entire system of the decision mechanism, a decision is made by search of the maximum value of the estimates $S_{\Lambda a}(x;\Lambda)$ of the score $S_a(x)$ shown in the expression (7).

$$a^* = \arg\max_{a \in P\dagger} Pr(a|x) \quad (1)$$

$$Pr(a|x) = \prod_{j=1}^{J} Pr(\alpha_j|x)^{1(\alpha_j \in a)} \{1 - Pr(\alpha_j|x)\}^{1(\alpha_j \notin a)} \quad (2)$$

$$S_a(x) = \ln \frac{Pr(a/x)}{Pr(\Phi/x)} \quad (3)$$

$$= \sum_{j=1}^{J} 1(\alpha_j \in a) \ln \frac{Pr(\alpha_j|x)}{1 - Pr(\alpha_j|x)} \quad (4)$$

$$a^* = \arg\max_{a \in P\dagger} S_a(x) \quad (5)$$

$$O(\alpha_j|x) = \frac{Pr(\alpha_j|x)}{1 - Pr(\alpha_j|x)} \quad (6)$$

$$S_{\Lambda a}(x;\Lambda) = \sum_{j=1}^{J} 1(\alpha_j \in a) \eta_j(x;\Lambda) \quad (7)$$

1.2 Decision combination mechanism based on accumulated score of logarithmic a posteriori odds The case is considered where a plurality of decision combination problems (a plurality of combined decision problems) are solved. Assume that decision on each element $q_i$ of a group $Q=\{q_i\}_{i=1}^I$ of I problems $\{q_i\}_{i=1}^I$ is $a_i \in P\dagger$. When a group $X=\{x_i\}_{i=1}^I$ of evidence $x_i$ of respective I problems $\{q_i\}_{i=1}^I$ is obtained, consider to find a group of the most probable decisions among a set $\Omega \subseteq P\dagger^I$ of decision groups which can be selected. When respective problems $q_i$ are independent from each other, the expression (8) holds for the a posteriori probability Pr(A|X) of a decision group $A=\{a_i\}_{i=1}^I \in \Omega$. Therefore, similar to the case of §1.1, if score $S_A(X)$ of a decision group A is defined as represented by the expressions (9) and (10), selection of a decision group A* shown in the expression (11) is equivalent to Bayesian decision rule. Since a true value of a posteriori probability Pr (A|X) is unknown actually, A* as represented by the expression (13) which maximizes score $S_{\wedge A}(X;\Lambda)$ defined by a sum of the estimates of the logarithmic a posteriori odds represented by the expression (12) is regarded as an optimal decision group.

$$Pr(A|X) = \prod_{i=1}^{I} Pr(\alpha_i|x_i) \tag{8}$$

$$S_A(X) = \ln \frac{Pr(A|X)}{\prod_{i=1}^{I} Pr(\Phi|x_i)} \tag{9}$$

$$= \sum_{i=1}^{I} \sum_{j=1}^{J} 1(\alpha_j \ a_i) \ln O(\alpha_j|x_i) \tag{10}$$

$$A^* = \arg\max_{A \ \Omega} S_A(X) \tag{11}$$

$$S_{\wedge A}(x;\Lambda) = \sum_{i=1}^{I} \sum_{j=1}^{J} 1(\alpha_j \ a_i)\eta_j(x_i;\Lambda) \tag{12}$$

$$A^* = \arg\max_{A \ \Omega} S_{\wedge A}(X;\Lambda) \tag{13}$$

1.3 Combination classification mechanism based on accumulated score of logarithmic a posteriori odds Then, consider the case where combinations are classified into any of C classes $\Omega_1, \Omega_2, \ldots, \Omega_C$ exclusive with each other of a universal set $\Omega$ of a decision group A by an evidence group X. In the case of classification, c* shown in the expressions (14) and (15) based on Bayesian decision rule should be employed as a classification result. This decision rule may be replaced with a decision rule represented by the expressions (16) and (17), which are equivalent to the expressions (14) and (15).

Since a true $S_A(X;\Lambda)$ value is unknown actually, a score for every class may be decided as represented by the expression (18) based on the estimates $S_{\wedge A}(X;\Lambda)$, and c* shown in the expression (19) may be employed as a classification result. Since it is difficult actually to find scores $S_A(X)$ for all elements A included in all classes, the score shown in the expression (20) may be alternatively used. A dynamic programming can be used for search of the maximum value, considerably reducing the amount of calculation.

In the following, used is score $S_{\wedge c}(X;\Lambda)$ represented by the expression (21) which is obtained by generalization of both scores represented by the expressions (18) and (20). It should be noted that $\xi_C$ is a positive constant. $S_{\wedge c}(X;\Lambda)$ matches the score represented by the expression (18) when $\xi_C = 1$, and approaches the score represented by the expression (20) limitlessly when $\xi_C \to \infty$.

$$c^* = \arg\max_c Pr(\Omega_c|X) \tag{14}$$

$$= \arg\max_c \sum_{A \ \Omega_c} Pr(A|X) \tag{15}$$

$$c^* = \arg\max_c \left( \ln \sum_{A \ \Omega_c} \frac{Pr(A|X)}{\prod_{i=1}^{I} Pr(\Phi|x_i)} \right) \tag{16}$$

$$= \arg\max_c \left( \ln \sum_{A \ \Omega_c} \exp(S_A(X;\Lambda)) \right) \tag{17}$$

$$S_c^{sum}(X;\Lambda) = \ln \sum_{A \ \Omega_c} \exp(S_A(X;\Lambda)) \tag{18}$$

$$c^* = \arg\max_c S_c(X;\Lambda) \tag{19}$$

$$S_c^{max}(X;\Lambda) = \max_{A \ \Omega_c} S_A(X;\Lambda) \tag{20}$$

$$S_c(X;\Lambda) = \frac{1}{\xi_C} \ln \sum_{A \ \Omega_c} \exp(\xi_C S_A(X;\Lambda)) \tag{21}$$

1.4 Pruning of candidates for decision combination and decision combination classification In order to implement decision combination described in §1.2 and decision combination classification described in §1.3 on a computer, it is necessary to find scores $S_{\wedge A}(X;\Lambda)$ for all possible decisions A. Since the total number of decision combinations A is $O(2^{JI})$, however, the total number explosively increases with I and J increased. Although the total number is decreased to some extent in search of the maximum value by using a dynamic programming, a method which sacrifices optimality of a result must be employed, when it is desired to further decrease the amount of calculation. One method is pruning, in which, when it is heuristically determined for a certain partial decision combination $B \in P\dagger^{I'}(I'<I)$ that all score values of decision combinations A including B as a part are negligibly small as compared to scores of the other decisions, the scores $S_A(X;\Lambda)$ are excluded from computation without being computed to the end. If pruning is applied to all $B \in P\dagger^{I'}$ for a certain fixed $I'<I$, and the number of the candidates is decreased to $1/N$, for example, the total number can be decreased to $1/N^{I-I'}$, resulting in dramatic reduction of the amount of calculation.

Assume that $\Phi(A)$ denotes a universal set of partial decision combinations leading to a certain decision combination A which are used for pruning determination. If pruning determination according to partial decision combination B is represented by a function $\omega_B(X;\Lambda)$, a pruning function $\omega_B(X;\Lambda)$ takes 0 when it is determined that the score value of a decision combination including B as a part is negligibly small, and takes 1 otherwise. In decision combination and decision combination classification including a pruning processing, $A\sim^*$ and $c\sim^*$ represented by the expressions (24) and (25) are selected assuming that the score function is the expressions (22) and (23). In calculation of a score function $S\sim_A(X;\Lambda)$ represented by the expression (22), since the value of $S\sim_A(X;\Lambda)$ becomes negative infinite for decision combination candidates to be rejected, it cannot be an optimal solution. Thus calculation of the value of $S\sim_2(X;\Lambda)$ can be omitted when it is known that the decision combination A is rejected, because in that case the value of $\exp(S\sim_2(X;\Lambda))$ in S in the expression (23) always equals to 0 in spite of the value of $S°_A(X;\Lambda)$, which does not affect the value of $S°c(X;\Lambda)$ in the expression (23).

Although A~* and C~* do not match A* and C* in general, selection of pruning function $\omega_B(X;\Lambda)$ considerably affects the frequency of mismatch and the amount of calculation. Taking that into consideration, a pruning function is appropriately selected based on empirical knowledge in general.

$$S_{\sim A}(X;\Lambda) = S\Lambda_A(X;\Lambda) + \sum_{B \in \Phi(A)} \ln \omega_B(X;\Lambda) \quad (22)$$

$$S_{\sim c}(X;\Lambda) = \frac{1}{\xi c} \ln \sum_{A \in \Omega_c} \exp(\xi_c S_{\sim A}(X;\Lambda)) \quad (23)$$

$$A\sim^* = \arg\max_{A \in \Omega} S_{\sim A}(X;\Lambda) \quad (24)$$

$$c\sim^* = \arg\max_c S_{\sim c}(X;\Lambda) \quad (25)$$

II. Optimization Design Method for Decision Combination and Decision Combination Classification Description will be given here of a design method of a parameter set Λ for a mechanism of deciding or classifying a decision group based on scores $S_{\sim A}(X;\Lambda)$, $S_{\sim C}(X;\Lambda)$ according to the expressions (22) and (23).

2.1 Design based on maximum likelihood criterion

The estimate $\pi_j(x;\Lambda)$ of a posteriori probability $\Pr(\alpha_j|x)$ of decision $\alpha_j$ based on a decision mechanism of a parameter set Λ are given as represented by the expression (26) according to the expression (6). Assuming that $p_j(x)$ is a two-valued function which takes 1 when decision for evidence x is correct, and takes 0 otherwise, logarithmic likelihood $l(x;\Lambda)$ of the parameter set Λ for evidence x is represented as in the expressions (27) and (28). At this time, a parameter set $\Lambda^*$ as represented by the expression (30) maximizing a likelihood function $L(\Lambda)$ represented by the expression (29) is optimal under the maximum likelihood criterion.

If $l(x;\Lambda)$ is a continuous function 1-st differentiable with respect to Λ, a suboptimal solution of $\Lambda^*$ can be found numerically with a steepest descent method or a generalized probability descent method.

This design method cannot consider a pruning processing. In addition, since a shape of distribution of a posteriori probability is generally unknown, such a parameter set based on maximum likelihood estimation obtained by assumption of a shape of distribution of a posteriori probability does not guarantee the minimum decision error for applied data. Unrobustness in the case where there is variation in the number of data for every class is also pointed out. Since the value of $p_j(x_i)$ cannot be established for every evidence $x_i$ in decision combination classification, maximum likelihood estimation is difficult. An EM algorithm, for example, must be used. It is possible to give an appropriate initial value for a design method by a probabilistic gradient search shown hereinafter.

$$\pi_j(x;\Lambda) = \frac{\exp(\eta_j(x;\Lambda))}{1 + \exp(\eta_j(x;\Lambda))} \quad (26)$$

$$l(x;\Lambda) = \ln \prod_{j=1}^{J} \pi_j(x;\Lambda)^{p_j(x)} \{1 - \pi_j(x;\Lambda)\}^{1-p_j(x)} \quad (27)$$

$$= \sum_{j=1}^{J} [p_j(x)\eta_j(x;\Lambda) - \ln\{1 + \exp(\eta_j(x;\Lambda))\}] \quad (28)$$

$$L(\Lambda) = E[l(x;\Lambda)] \quad (29)$$

$$\Lambda^* = \arg\max_\Lambda L(\Lambda) \quad (30)$$

2.2 Design based on minimum decision error criterion

The most important object of a parameter set design is to minimize a decision error of a resultant decision mechanism. Therefore, a design method using direct minimization of a decision error as a criterion will be described in this section.

When a correct decision group is $A^0$, a cost function $l(X;\Lambda)$ is decided as represented by the expression (31). The cost function $l(X;\Lambda)$ is a function which takes 1 and 0 when the decision combination according to the expression (13) is incorrect and correct, respectively. Therefore, the expectation $L(\Lambda)$ represented by the expression (32) indicates a decision error rate. A parameter set $\Lambda^{**}$ using the expectation $L(\Lambda)$ as a loss function and minimizing the same is a parameter set minimizing a decision combination error.

In the case of classification, the cost function $l(X;\Lambda)$ represented by the expression (34) is used, assuming that a correct classification result is $c^0$.

Since a method for effectively finding $\Lambda^{**}$ based on the above definition from a finite number of samples is unknown, the cost function is approximated by the continuous function $1_\sim(X;\Lambda)$ represented by the expression (35). It should be noted that $\zeta_A$ is a positive constant, an operator $|\cdot|$ represents the total number of elements of a set, and that a function $1_\sim(\cdot)$ is a 1-st differentiable continuous function which approximates a binary step as represented by the expression (36). A sigmoid function $1_\sim(x)=1/\{1+\exp(-x)\}$, for example, is considered. The function $1_\sim(\cdot)$ is called a smooth step function hereinafter.

A classification problem is approximated by the expression (37). It should be noted that $\zeta_C$ is a positive constant. If $1_\sim(X;\Lambda)$ is a continuous function 1-st differentiable with respect to Λ, a generalized probabilistic descent method can be used. By assuming that $1_\sim(y) \to 1(y)$, an approximation cost function can be limitlessly approached to a true cost function.

$$l(x;\Lambda) = 1\left(S_{\sim A}^0(X;\Lambda) \leq \max_{A \neq A^0} S_{\sim A}(X;\Lambda)\right) \quad (31)$$

$$L(\Lambda) = E[l(x;\Lambda)] \quad (32)$$

$$\Lambda^{**} = \arg\min_\Lambda L(\Lambda) \quad (33)$$

$$l(X;\Lambda) + 1\left(S_{\sim c}^0(X;\Lambda) \leq \max_{c \neq c^0} S_{\sim c}(X;\Lambda)\right) \quad (34)$$

$$l_\sim(X;\Lambda) = \quad (35)$$

$$1_\sim\left(S_{\sim A}^0(X;\Lambda) - \frac{1}{\xi_A} \frac{1}{|\Omega|-1} \sum_{A \neq A^0} \exp(\xi_A S_{\sim A}(X;\Lambda))\right)$$

$$1(y) = \begin{cases} 0, & y < 0 \\ 1, & 0 \leq y \end{cases} \quad (36)$$

$$l_\sim(X;\Lambda) = \quad (37)$$

$$1_\sim\left(S_{\sim c}^0(X;\Lambda) - \frac{1}{\xi_c} \ln \frac{1}{C-1} \sum_{c \neq c^0} \exp(\xi_c S_{\sim c}(X;\Lambda))\right)$$

2.3 Design based on criterion of amount of calculation added to minimum decision error A parameter set must be optimized in terms of not only minimization of a decision error rate, but also the amount of calculation.

Define the cost function l(X;Λ) of a decision error or classification error according to the expression (31) or (34), similar to the case of §2.2. In addition, define a cost function l'(X;Λ) which directly reflects the amount of calculation, such as l'(X;Λ) represented by the expression (38), wherein ψ(X) is a set of partial decisions B used for pruning candidates when a decision group is obtained based on an obtained evidence group X. In this case, the expectation of l'(X;Λ) represents insufficiency of pruning. It is expected that the more insufficient pruning is, the larger the amount of calculation is. When a loss function is defined, as represented by the expression (39), by the expectation L'(Λ) of a weighted sum of two cost functions, either of which is multiplied by a positive constant γ, a parameter set Λ'** which minimizes the L'(Λ) as represented by the expression (40) can be regarded as an optimal parameter set in terms of both the number of decision errors and the amount of calculation. The degree of balance between these is controlled by the constant γ.

When both two cost functions l(X;Λ) and l'(X;Λ) are approximated by a continuous function 1-st differentiable with respect to Λ using a smooth step function similar to the case of the expression (35), a suboptimal numerical solution of Λ'** can be found with a generalized probabilistic descent method.

$$l'(X;\Lambda) = \sum_{B \in \psi(x)} \omega_B(X;\Lambda) \tag{38}$$

$$L'(\Lambda) = E[l(X;\Lambda) + \gamma l'(X;\Lambda)] \tag{39}$$

$$\Lambda'^{**} = \arg\min_{\Lambda} L'(\Lambda) \tag{40}$$

It should be noted that the cost functions l (X;Λ) and l'(X;Λ) are not limited to the function decided according to the expression (31) or the like.

III. Embodiment of Speech Recognition Apparatus

Figure 1:
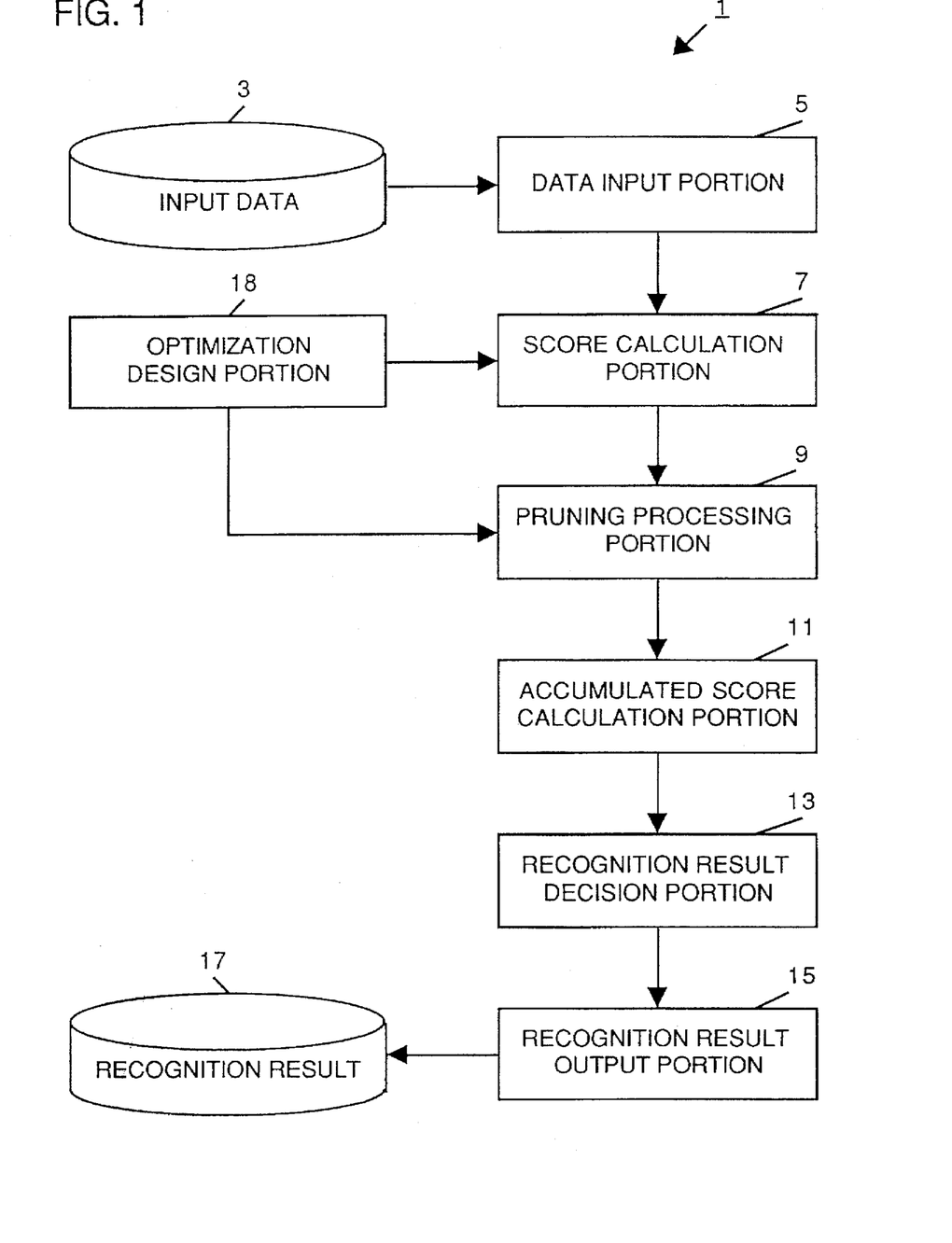
FIG. 1 is a schematic block diagram showing a speech recognition apparatus according to one embodiment of the present invention.
Figure 2:
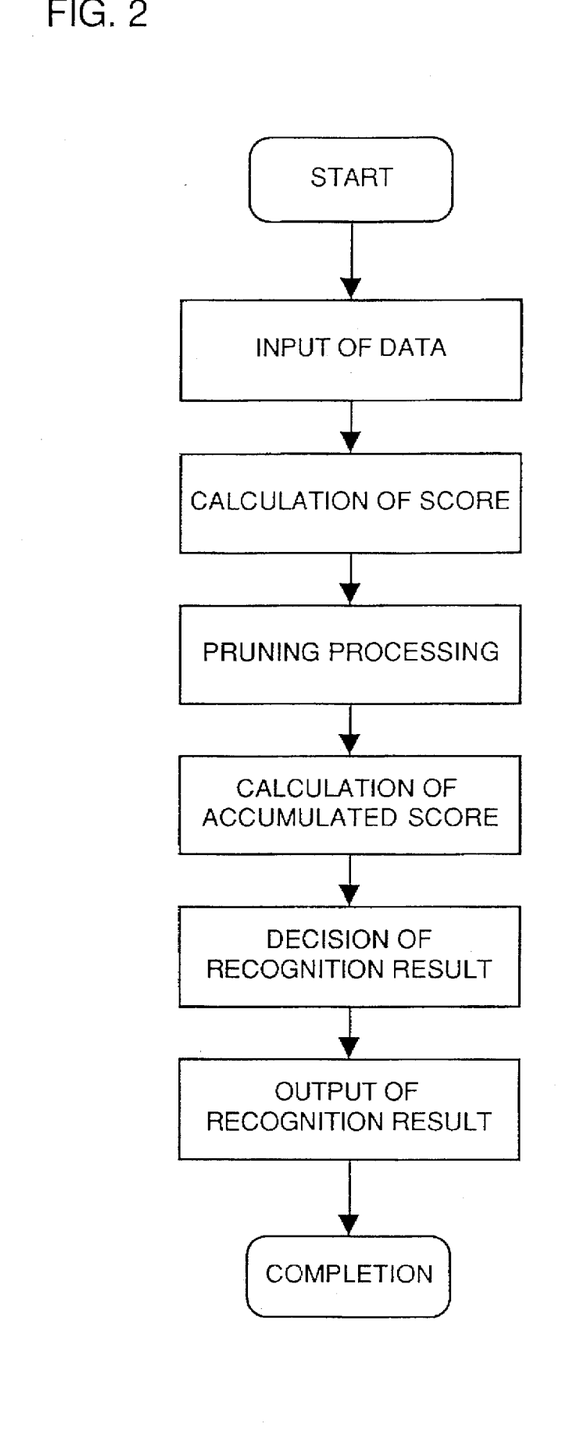
FIG. 2 is a flow chart for explaining operation of the speech recognition apparatus shown in FIG. 1.
Figure 3:
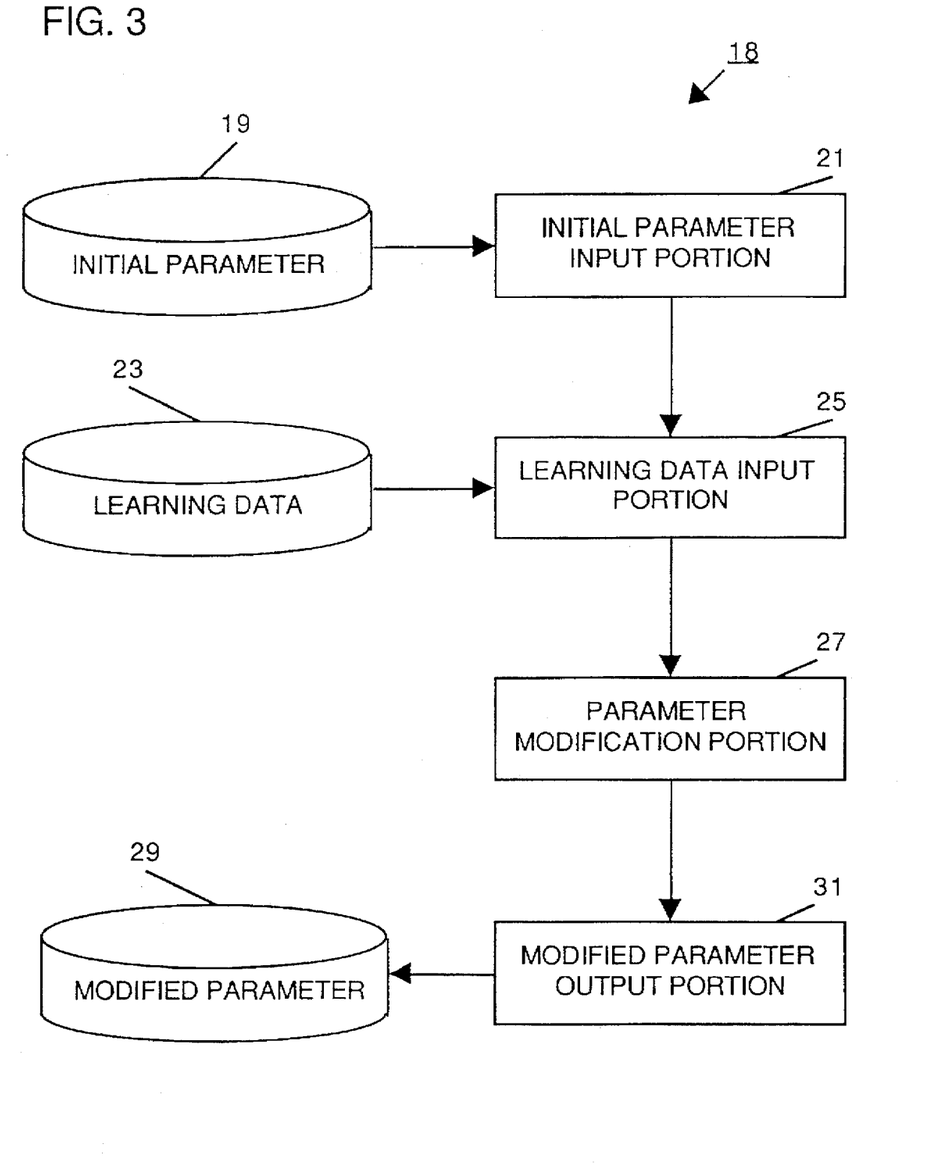
FIG. 3 is a schematic block diagram showing the internal configuration of an optimization design portion of FIG. 1.
Figure 4:
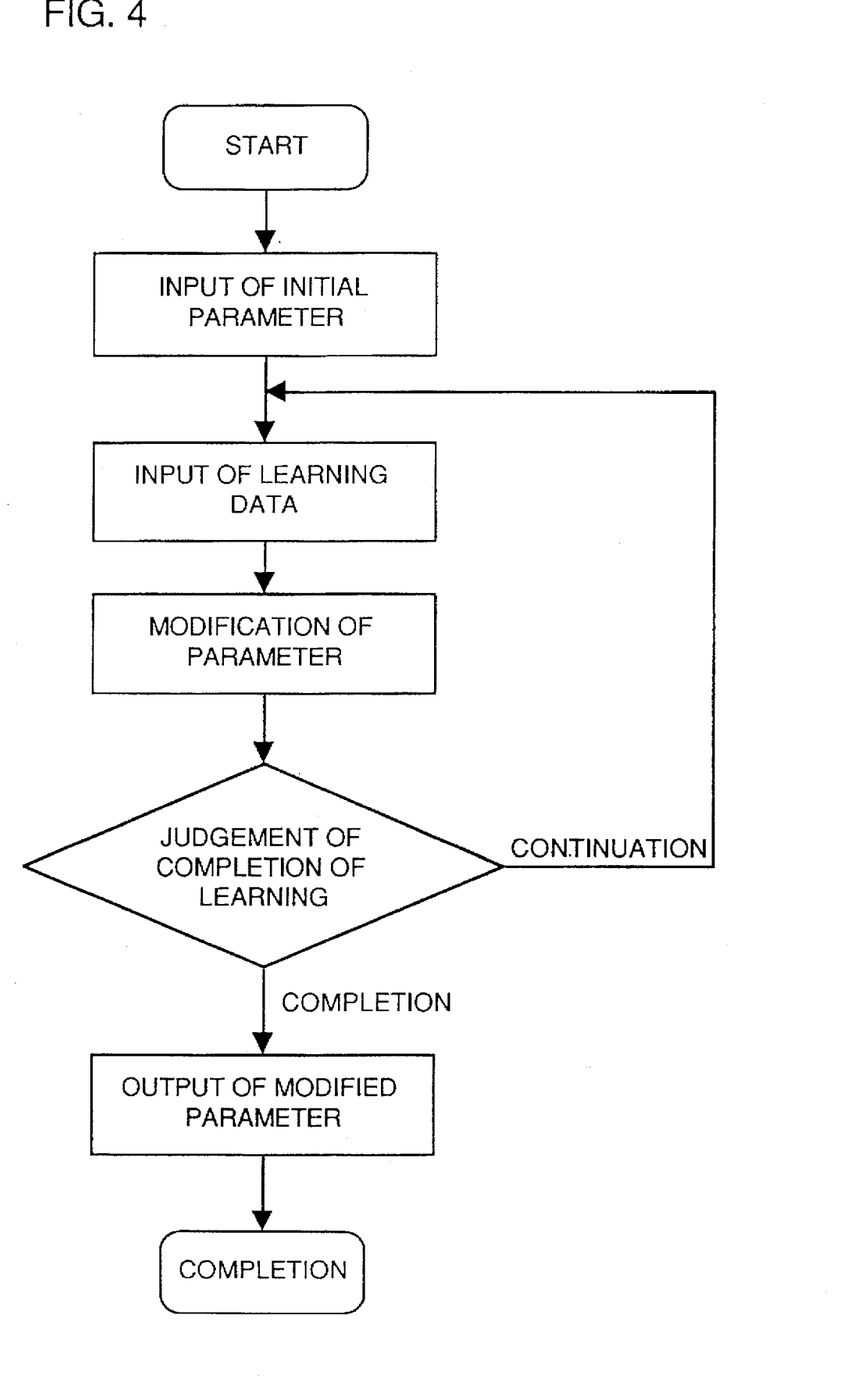
FIG. 4 is a flow chart for explaining operation of the optimization design portion of FIG. 3.

FIG. 1 is a schematic block diagram showing a speech recognition apparatus according to one embodiment of the present invention. FIG. 2 is a flow chart for explaining operation of the speech recognition apparatus shown in FIG. 1. FIG. 3 is a schematic block diagram showing an internal configuration of an optimization design portion of FIG. 1. FIG. 4 is a flow chart for explaining operation of the optimization design portion of FIG. 3.

In this section, the speech recognition apparatus will be described as a specific example of a decision combination mechanism. The speech recognition apparatus will first be described specifically with reference to FIGS. 1 to 4. Then, description will be given of a logarithmic a posteriori odds estimation function, recognition of a word sequence, pruning of a word and the like.

Referring to FIG. 1, a speech recognition apparatus 1 includes a data input portion 5, a score calculation portion 7, a pruning processing portion 9, an accumulated score calculation portion 11, a recognition result decision portion 13, a recognition result output portion 15, and an optimization design portion 18. Input data 3 is applied to data input portion 5. Input data 3 is a time series speech pattern on speech, specifically. Based on input data 3 applied to data input portion 5, score calculation portion 7 decides scores based on the a posteriori odds described in 5176 1.1. Pruning processing portion 9 prunes the scores calculated by score calculation portion 7 in order to facilitate the processing in accumulated score calculation portion 11 and recognition result decision portion 13. More specifically, pruning for decision combination and decision combination classification described in §1.4 is carried out.

Accumulated score calculation portion 11 decides an accumulated score of the logarithmic a posteriori odds described in §1.2. The accumulated score is an accumulation of scores calculated by score calculation portion 7. As a number of scores increases, the number of combinations for the accumulated score increases as described before. Therefore, pruning processing portion 9 restricts the number of scores as much as possible. Recognition result decision portion 13 decides a recognition result of speech based on the value of the accumulated score calculated by accumulated score calculation portion 11. Recognition result output portion 15 provides the result as a recognition result 17.

Referring to FIGS. 3 and 4, description will now be given of optimization design portion 18 shown in FIG. 1.

Optimization design portion 18 carries out optimization of only score decision by score calculation portion 7, or optimization of both score decision by score calculation portion 7 and pruning by pruning processing portion 9. Operation of optimization design portion 18 may be carried out sequentially, synchronously with or prior to operation of speech recognition apparatus 1. The optimization design includes a design based on the maximum likelihood criterion described in §2.1, a design based on the minimum decision error criterion described in §2.2, and a design based on pruning described in §2.3. Based on any of these designs, optimization design portion 18 includes an initial parameter input portion 21 to which an initial parameter 19 is applied, a learning data input portion 25 to which learning data 23 is applied, a parameter modification portion 27, and a modified parameter output portion 31 providing a modified parameter 29.

Initial parameter 19 is the above described parameter of system. Learning data 23 is data accompanied by a time series speech pattern and a correct recognition result of the speech pattern. Being accompanied by the correct recognition result, it is clear whether the recognition result of the time series speech pattern is correct or incorrect. Therefore, based on the correct recognition result, parameter modification portion 27 modifies a parameter, that is, the above described Λ. If the maximum likelihood criterion described in §2.1, for example, is used as a criterion for modification, the parameter set is optimized under the maximum likelihood criterion. If parameter modification portion 27 modifies the parameter based on the minimum decision error criterion in §2.2, the decision error rate of recognition result by recognition result decision portion 13 shown in FIG. 1 becomes minimized. If parameter modification portion 27 modifies the parameter based on the criterion of the amount of calculation added to the minimum decision error in §2.3, the parameter set is optimized under the criterion of the amount of calculation added to the decision error rate of recognition result by recognition result decision portion 13.

As shown in the flow chart of FIG. 4, by repetition of the procedure from learning data input to judgement of completion of learning, optimization design portion 18 can carry out a more optimal parameter design.

From §1.1 to §2.3, a set was used for description. As a generalized example, description will now be given of some cautions of the speech recognition apparatus hereinafter. First, assume that observed speech is $X=\{x_i\uparrow\}_{i=1}^I$, wherein each element is an S-dimensional real vector ($x_i\uparrow \in R_e^S$). When a word vocabulary is $W\dagger=\{w_k\}_{k=1}^K$, it is assumed that the most probable word sequence $W_{C^*}$ among all word sequences $W_C$ represented by the expression (41) is found when observed time series X is obtained with a set of grammatically allowable word sequences denoted as G. In the expression (41), lc is a length of a word sequence.

Assuming that $\Omega_C$ represents a set of combinations resulting in word sequence $W_C$ among combinations for all s, e of decision $a_s^e$ as to which word observed partial time series $X_s^e$ represented by the expression (42) matches, optimization design portion 18 can design parameter set $\Lambda'^{**}$ using any of the three optimal criteria.

$$W_c = \{w_{k_c}(1), w_{k_c}(2), \ldots, w_{k_c}(lc)\} \in G \tag{41}$$

$$X_s^e = \{x_s\uparrow, x_{s+1}\uparrow, \ldots, x_{e-1}\uparrow, x_e\}(1 \leq s \leq e \leq I) \tag{42}$$

3.1 Logarithmic a posteriori odds estimation function

It is assumed that the logarithmic a posteriori odds of observed partial time series $X_s^e$ being determined as a word $w_k$ is estimated to be $Y_k(X_s^e;\Lambda)$ by parameter set $\Lambda$. It is assumed that each word $w_k$ is represented as concatenation of elements of a subword (phoneme or acoustic event, for example) set $A\dagger = \{\alpha_j\}_{j=1}^J$, and that $\Lambda$ is $(\Lambda = \{\lambda_J\}_{j=1}^J)$ formed of model $\lambda_j$ for every subword.

It is assumed that each subword model is $(\lambda_j = \{R_j, V_j, \phi_j\uparrow\})$ formed of a prototype $R_j$, a variance-covariance matrix set $V_j$, and a coefficient vector $\phi_j\uparrow$. It is assumed that the prototype is N sets of M reference vectors concatenated continuously, and $R_j = \{R_{jn} = \{r_{jnm}\uparrow\}_{m=1}^M\}_{n=1}^N$, $V_j = \{V_{jn} = \{\Sigma_{jnm}\}_{m=1}^M\}_{n=1}^N$, $\phi_j\uparrow = \{\phi_{j0}, \phi_{j1}\}$, wherein $r_{jnm}\uparrow \in R_e^s$, $\Sigma_{jnm} \in R_e^{s*s}$ (s*s means s×s).

First, a model is assumed in which the logarithmic a posteriori odds of observed partial time series $X_s^e$ being determined as subword $\alpha_j$ is estimated by a linear expression of a distance $D(X_s^e, R_j, V_j)$ determined by variance-covariance matrix set $V_j$ of prototype $R_j$, and $\eta_j(X_s^e;\Lambda)$ is defined as represented by the expression (43). Here, distance $D(X_s^e, R_j, V_j)$ is defined hierarchically as follows.

First, define a distance $\delta$ between a vector $x_i\uparrow$ at a time i of observed speech and a reference vector $r_{jnm}\uparrow$ as represented by the expression (44) using a quadratic form determined by corresponding variance-covariance matrix $\Sigma_{jnm}$. This distance is called a local distance.

Secondly, define a distance $\Delta$ between the vector $x_i\uparrow$ at time i of observed speech and the n-th reference vector set $R_{jn}$ of prototype $R_j$ as represented by the expression (45), wherein $\xi_s$ is a positive constant. This distance is called a state distance.

Thirdly, consider a distance in a matching path between observed partial time series $X_s^e$ and prototype $R_j$. Matching path $\theta$, given in a form as represented by the expression (46), is a set of two dimensional coordinates matching time i=s, s+1, ..., e-1, e and index n=1, 2, ..., N of a reference vector set of the prototype according to $\{i, m\} = \{\iota_l, \nu_l\}$. It is also assumed that matching path $\theta$ satisfies all the end point condition as represented by the expression (47) and the order condition as represented by the expression (48). At this time, a distance in each matching path $\theta$ is defined as represented by the expression (49), wherein $\rho_l(\theta)$ is a weighted factor depending on matching path $\theta$, which satisfies $$\sum_{l=1}^{L_e} \rho_l(\theta) = 1,$$

and $\Theta_s^e$ is a universal set of matching path $\theta$ which is possible in an interval [s, e]. This distance $D_\theta(\cdot)$ is called a path distance.

Finally, define a distance $D(\cdot)$ of the expression (43) as represented by the expression (50). This distance is called a general distance. In the expression, $\xi_G$ is a positive constant.

Then using logarithmic a posteriori odds $\eta_j(\cdot)$ for every subword, logarithmic a posteriori odds $Y_k(X_s^e;\Lambda)$ of word $w_k$ as shown in the expression (51) represented by concatenation of subwords $\alpha_j$ is defined hierarchically as follows.

First, consider the logarithmic a posteriori odds in one subword boundary sequence of observed partial time series $X_s^e$. It is assumed that a boundary sequence $\beta$ represented by the expression (52) matches the partial time series represented by (53) and the first subword represented by (54) of word $w_k$, and that it satisfies the end point condition represented by the expression (55). At this time, the a posteriori odds of word $w_k$ in each subword boundary sequence is decided as represented by the expression (56).

Secondly, define corresponding a posteriori odds $Y_k$ of word $w_k$ as represented by the expression (57), wherein $\xi_W$ is a positive constant, and $B\dagger_s^e$ is a universal set of boundary sequence $\beta$ which is possible in $X_s^e$.

$$\eta_j(X_s^e;\Lambda) = \phi_{j0} + \phi_{j1}D(X_s^e, R_j, V_j) \tag{43}$$

$$\delta\left(x_i\uparrow, r_{jnm}\uparrow, \sum_{jnm}\right) = (x_i\uparrow - r_{jnm}\uparrow)^T \sum_{jnm}^{-1} (x_i\uparrow - r_{jnm}\uparrow) \tag{44}$$

$$\Delta(x_i\uparrow, R_{jn}, V_{jn}) = \frac{1}{\xi_s} \ln \frac{1}{M} \sum_{m=1}^M \exp\left(\xi_s \delta\left(x_i\uparrow, r_{jnm}\uparrow, \sum_{jnm}\right)\right) \tag{45}$$

$$\theta = \{\iota_l, \nu_l\}_{l=1}^{L_\theta} \tag{46}$$

$$\iota_1 = S, \iota_{L_\theta} = e, \nu_1 = 1, \nu_{L_\theta} = N \tag{47}$$

$$\iota_l \leq \iota_{l+1}, \nu_l \leq \nu_{l+1} \tag{48}$$

$$D_\theta(X_s^e, R_j, V_j) = \sum_{l=1}^{L_\theta} \rho_l(\theta)\Delta(x_{\iota_l}\uparrow, R_{j\nu_l}, V_{j\nu_l}) \tag{49}$$

$$D(X_s^e, R_j, V_j) = \tag{50}$$

$$-\frac{1}{\xi_G} \ln \frac{1}{|\Theta_s^e|} \sum_{\theta \in \Theta_s^e} \exp(-\xi_G D_\theta(X_s^e, R_j, V_j))$$

$$w_k = \{\alpha_{jk(1)}, \alpha_{jk(2)}, \ldots, \alpha_{jk(L_k)}\} \tag{51}$$

$$\beta = \{b_l\}_{l=0}^{L_k} \tag{52}$$

$$X_{b_{l-1}}^{b_l} \tag{53}$$

$$\alpha_{jk(l)} \tag{54}$$

$$b_0 = s, b_{L_k} = e \tag{55}$$

$$y_{k\beta}(X_s^e;\Lambda) = \sum_{l=1}^{L_k} \eta_{jk(l)}(X_{b_{l-1}}^{b_l};\Lambda) \tag{56}$$

$$Y_k(X_s^e;\Lambda) = \frac{1}{\xi_N} \ln \sum_{\beta \in B\dagger_s^e} \exp(\xi_W y_{k\beta}(X_s^e;\Lambda)) \tag{57}$$

3.2 Recognition of word sequence

Because of a characteristic of a problem of continuous speech recognition, a universal set $\Omega$ of decision combination for obtaining a word sequence is a set of A satisfying conditions including condition 1 as represented by the expression (58) since, when there exists a word, the word must be decided to be one word, and condition 2 as represented by the expression (59) since there must be no time overlapping between adjacent words. According to the condition 1, a word is uniquely decided from a partial decision satisfying $a_s^e \neq \Phi$. Since a time sequence of words is clarified according to the condition 2, a word sequence is also uniquely decided.

According to the above described parameter set, the score of combination A of partial decisions $a_s^e$ is calculated as represented by the expression (60). Therefore, the score of word sequence $W_c$ is calculated using the expressions (60) and (21). As described above, when accumulation of the logarithmic a posteriori odds is used as a score of a word sequence, the score can be compared irrespective of the number of words included in the word sequence.

$$P\dagger = \{\Phi, \{w_1\}, \{w_2\}, \ldots, \{w_K\}\} \tag{58}$$

$$\forall \{a_{s_1}^{e_1} \in A, a_{s_2}^{e_2} \in A | s_1 \le s_2 \le e_1 \lor s_1 \le e_2 \le e_1\}; \tag{59}$$

$$a_{s_1}^{e_1} = \Phi \lor a_{s_2}^{e_2} = \Phi$$

$$S\Lambda_A(X;\Lambda) = \sum_{s=1}^{I} \sum_{e=s}^{I} \sum_{k=1}^{K} 1(w_k \in a_s^e) Y_k(X_s^e;\Lambda) \tag{60}$$

3.3 Pruning at word level

Since there are $|P\dagger|=J+1$ kinds of decisions for all partially observed time series $X_s^e$, the total number of decision combinations A is on the order represented by the expression (61), which is relatively large. In this section, the case is considered where pruning at a word level is introduced in order to decrease the total number. As an example, a simple and classical method to be described next is employed here. More specifically, only partially observed time series, which satisfies both a condition 1 that the value of the score takes the maximum value among scores for neighboring partially observed time series, and a condition 2 that the value of the score exceeds the threshold value, is left for each word as a candidate of the same.

Let $B(w_k|X_s^e)$ denote a partial decision that partially observed time series $X_s^e$ matches word $w_k$, the score of a word sequence including pruning based on the above conditions is represented as shown in the expression (62). A pruning function defined in the right side of the expression (63) is used in the expression (62), wherein it is assumed that $\omega_{1k}(\cdot)$ and $\omega_{2k}(\cdot)$ correspond to the conditions 1 and 2, respectively, and that they are decided as represented by the expressions (64) and (65), respectively. In these expressions, $\kappa_k$ is a constant, $h_k$ is a threshold value, and $S\dagger_k(e)$ is a set of values which a beginning end point s of word $w_k$ can take with respect to an ending end point e, $\Lambda=\{\{\lambda_j\}_{j=1}^J, \{h_k\}_{k=1}^K\}$.

In terms of efficiency of search, $\omega_{1k}(\cdot)$ divides for representation the condition that "the score is maximum in neighboring partially observed time series" into two maximum conditions regarding the beginning end point and the ending end point. When the function represented by the expression (63) is approximated by a continuous function in order for application of optimization in §2.3, the function is decided as represented by the expression (66). The right side of the expression (66) is decided by the functions represented by the expressions (67) to (69).

$$O((J+1)^{P/2}) \tag{61}$$

$$S_{-A}(X;\Lambda) = S\Lambda_A(X;\Lambda) + \sum_{1 \le s \le e \le I} \omega_{B(w_k|X_s^e)}(X;\Lambda) \tag{62}$$

$$\omega_{B(w_k|X_s^e)}(X;\Lambda) = \omega_{1k}(X_s^e;\Lambda) \cdot \omega_{2k}(X_s^e;\Lambda) \tag{63}$$

$$\omega_{1k}(X_s^e;\Lambda) = 1\left(Y_k(X_s^e;\Lambda) - \max_{s' \in S\dagger_k(e')} Y_k(X_{s'}^e \times;\Lambda)\right) \cdot \tag{64}$$

$$1\left(Y_k(X_s^e;\Lambda) - \max_{1 \le |e'-e| \le \kappa_k} \max_{s' \in s\dagger_k(e')} Y_k(X_{s'}^{e'};\Lambda)\right)$$

$$\omega_{2k}(X_s^e;\Lambda) = 1(Y_k(X_s^e;\Lambda) - h_k) \tag{65}$$

$$\omega_{B(w_k|X_s^e)}(X;\Lambda) \approx \omega_{\sim 1k}(X_s^e;\Lambda) \cdot \omega_{\sim 2k}(X_s^e;\Lambda) \tag{66}$$

$$\omega_{\sim 1k}(X_s^e;\Lambda) = 1\sim(Y_k(X_s^e;\Lambda) - \chi_{ek}(X;\Lambda)) \cdot \tag{67}$$

$$1\sim\left(Y_k(X_s^e;\Lambda) - \frac{1}{\xi_E} \ln \frac{1}{2\kappa_k - 1} \sum_{1 \le |e'-e| \le \kappa_k} \exp(\xi_E \chi_{e'k}(X;\Lambda))\right)$$

-continued $$\omega_{\sim 2k}(X_s^e;\Lambda) = 1\sim(Y_k(X_s^e;\Lambda) - h_k) \tag{68}$$

$$\chi_{ek}(X;\Lambda) = -\frac{1}{\xi_B} \ln \frac{1}{|S\dagger_k(e)|} \sum_{s' \in S\dagger_k(e)} \exp(-\xi_s Y_k(X_{s'}^e;\Lambda)) \tag{69}$$

3.4 Implementation

As described above, a speech recognition apparatus using an optimization method should be implemented theoretically. However, what is given in actuality is only limited computer resources and limited learning samples. It is considered that we must face various problems actually. Description will now be given of how to cope with these problems practically.

First, consider implementation of recognition and learning with a limited amount of calculation. In definition of a score according to a logarithmic a posteriori odds estimation function, such a form as represented by the expression (21) is often used. As described above, a large amount of calculation is required in order to find the value of score. Therefore, a positive infinity limit of a constant such as $\xi_C$, that is, a maximum value or a minimum value, is alternatively used, if necessary. As a result, it is possible to reduce the amount of calculation by a dynamic programming or the like.

If, for example, a sigmoid function is used as a smooth step function $1\sim(\cdot)$ which appears on definition of a pruning function according to the expression (63), the value of the sigmoid function is always positive. Therefore, all the word hypotheses to be originally rejected in pruning must be left at the time of learning. Therefore, a piece-wise linear function represented by the expression (70) or a piece-wise parabola function represented by the expression (71) which always takes 0 is alternatively used at values far from the threshold value.

Secondly, since an optimal parameter must be estimated from a limited number of learning samples in practice, the number of free parameters must be decreased as much as possible. For example, since variance-covariance matrix $\Sigma_{93\ jnm}$ in a subword model has a large number of free parameters, the variance-covariance must be fixed to an identity matrix or a diagonal matrix, so that only a diagonal element is a free parameter. In particular, to set parameters which seem to be less independent to a "tied" relation is effective, such as a common threshold value $h_k$ for pruning irrespective of a word, or representation of all word models by concatenation of a fewer kinds of subwords, as described above.

Thirdly, since the method of this embodiment uses gradient search, care must be taken of a balance between adjustment quantities of respective parameters so that convergence will not be extremely delayed. Care must also be taken of a domain of variability of a parameter. Since a domain of variability of $\phi_{ji}$ is $(-\infty, 0)$, for example, $\phi_{ji}$ may sometimes go out of a domain of variability allowed by small modification based on definition of gradient search. In such a case, $\phi_{ji}$ may be replaced with $\phi_{ji}=-\exp(\phi'_{ji})$, so that $\phi'_{ji}$ is a free parameter of a domain of variability $(-\infty, \infty)$. Alternatively, the system may be configured without using parameters whose adjustment quantities are difficult to adjust. For example, in $\eta_j (X_s^e; \Lambda)$ of the expression (43) used in §3.1, coefficient vector $\phi_j\dagger$ was used as a parameter. However, $\eta_j (X_s^e; \Lambda)$ is defined here by a function represented by the expression (72) or a function represented by the expression (73) as a possibility based on contention with a neighboring class or the above described "garbage class". In these expressions, $\zeta_D$ is a positive constant, and $\lambda_0=\{R_0, V_0\}$ is a model of "garbage class".

$$1\sim(x;\alpha) = \begin{cases} 0 & \text{if } x \leq -\frac{1}{2\alpha}, \\ \frac{1}{2}(\alpha x + 1) & \text{if } -\frac{1}{2\alpha} < x \leq \frac{1}{2\alpha}, \\ 1 & \text{if } \frac{1}{2\alpha} < x \end{cases} \quad (70)$$

$$1\sim(x;\alpha) = \begin{cases} 0 & \text{if } x \leq -\frac{1}{\alpha}, \\ \frac{1}{2}(\alpha x + 1)^2 & \text{if } -\frac{1}{\alpha} < x \leq 0, \\ 1 - \frac{1}{2}(\alpha x - 1)^2 & \text{if } 0 < x \leq \frac{1}{\alpha}, \\ 1 & \text{if } \frac{1}{\alpha} < x \end{cases} \quad (71)$$

$$\eta_j(X_s^e;\Lambda) = -D(X_s^e, R_j, V_j) - \quad (72)$$

$$\frac{1}{\zeta_D} \ln \frac{1}{J-1} \sum_{j \neq j} \exp(-\zeta_D D(X_s^e, R_j, V_j))$$

$$\eta_j(X_s^e;\Lambda) = -D(X_s^e, R_j, V_j) + D(X_s^e, R_0, V_0) \quad (73)$$

IV. Conclusion

As a framework for solving a decision combination problem involving uncertainty, description was made of a design method minimizing the number of decision errors and the amount of calculation in a framework including formulation of what is based on accumulation of logarithmic a posteriori odds and pruning for reducing the amount of calculation or saving the storage capacity. A framework of a speech recognition method and a speech recognition apparatus was described as this design method. However, this framework can be applied not only to speech recognition but also to an inference problem in general involving uncertainty. In only the field of speech recognition, there are many options in logarithmic a posteriori odds estimation functions and pruning criteria. It is necessary to decide the logarithmic a posteriori odds estimation function or the pruning criterion taking various conditions into consideration.

The decision mechanism can be applied to a parallel distributed computer, since the mechanism uses scores individually evaluated for a plurality of decisions which can be made from one evidence.

As described above, according to the embodiments of the present invention, since respective possibilities of recognition of a plurality of partial patterns forming a continuous pattern are decided by physical quantities based on the estimate of a posteriori odds, and the continuous pattern is recognized based on a possibility of a combination of the partial patterns decided by accumulation of the physical quantities, pattern recognition supported theoretically can be carried out.

According to the embodiments of the present invention, by pruning partial pattern candidates based on physical quantities based on the estimate of the a posteriori odds, calculation of an accumulated physical quantity is facilitated, resulting in efficient pattern recognition.

Further, according to the embodiments of the present invention, by using a parameter optimized based on a predetermined criterion, optimized pattern recognition can be carried out.

Further, according to the embodiments of the present invention, since respective possibilities of recognition of a plurality of partial patterns forming a speech pattern are decided by scores based on the estimate of the a posteriori odds, and the speech pattern is recognized based on a possibility of a combination of the partial patterns decided by accumulation of the scores, speech recognition supported theoretically can be carried out.

Further, according to the embodiments of the present invention, by pruning partial pattern candidates based on the score based on the estimate of the a posteriori odds, calculation of an accumulated score is facilitated, resulting in efficient speech recognition.

Further, according to the embodiments of the present invention, by using a parameter optimized based on a predetermined criterion, optimized speech recognition can be carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pattern recognition method for classifying a continuous pattern representative of a physical activity or phenomenon to one or predetermined classes each indicating a combination of one or more predetermined subclasses, comprising:

a first step of determining a plurality of partial scores each indicating an estimate of logarithm of a posteriori odds that one of partial patterns of said continuous pattern is classified to one of said subclasses;

a second step of determining accumulated scores each indicating summation of one or more of said partial scores; and a third step of classifying said continuous pattern into one of said predetermined classes based on said determined accumulated scores, wherein scores of any possible partial patterns are used, and the partial patterns are not first isolated.

2. The pattern recognition method as recited in claim 1, wherein said first step includes the step of pruning candidates of said partial patterns for determination of said accumulated score or classification of said continuous pattern.

3. The pattern recognition method as recited in claim 2, wherein said first step includes the step of finding the estimate of said a posteriori odds using a parameter maximizing likelihood of the estimated a posteriori odds for determination of said score.

4. The pattern recognition method as recited in claim 2, wherein said first step includes the step of representing a classification error rate as a predetermined function and finding the estimate of said a posteriori odds using a parameter minimizing the value of the function for determination of said score.

5. The pattern recognition method as recited in claim 2, wherein said first step includes the step of representing a classification error rate and a calculation amount as a predetermined function and finding the estimate of said a posteriori odds using a parameter minimizing the value of the function for determination of said score.

6. The pattern recognition method as recited in claim 2, wherein said first step includes the step of representing a classification error rate as a predetermined function and finding the estimate of said a posteriori odds using a parameter minimizing the value of the function for determination of said score and pruning of said partial patterns.

7. The pattern recognition method as recited in claim 2, wherein
said first step includes the step of representing a classification error rate and a calculation amount as a predetermined function and finding the estimate of said a posteriori odds using a parameter minimizing the value of the function for determination of said score and pruning of said partial patterns.

8. The pattern recognition method as recited in claim 1, wherein
said first step includes the step of finding the estimate of said a posteriori odds using a parameter maximizing likelihood of the estimated a posteriori odds for determination of said score.

9. The pattern recognition method as recited in claim 1, wherein
said first step includes the step of representing a classification error rate as a predetermined function and finding the estimate of said a posteriori odds using a parameter minimizing the value of the function for determination of said score.

10. The pattern recognition method as recited in claim 1, wherein
said first step includes the step of representing a classification error rate and a calculation amount as a predetermined function and finding the estimate of said a posteriori odds using a parameter minimizing the value of the function for determination of said score.

11. A speech recognition method for classifying a time series speech pattern representative of a physical activity or phenomenon to one of predetermined classes each indicating a combination of one or more predetermined subclasses, comprising:
a first step of determining a plurality of partial scores each indicating an estimate of logarithm of a posteriori odds that one of partial patterns of said speech pattern is classified to one of said subclasses;
a second step of determining accumulated scores each indicating summation of one or more of said partial scores; and
a third step of classifying said speech pattern into one of said predetermined classes based on said determined accumulated scores, wherein
scores of any possible partial patterns are used, and
the partial patterns are not first isolated.

12. The speech recognition method as recited in claim 11, wherein
said first step includes the step of pruning candidates of said partial patterns for determination of said accumulated score or classification of said speech pattern.

13. The speech recognition method as recited in claim 12, wherein
said first step includes the step of finding the estimate of said a posteriori odds using a parameter maximizing likelihood of the estimated a posteriori odds for determination of said score.

14. The speech recognition method as recited in claim 12, wherein
said first step includes the step of representing a classification error rate as a predetermined function and finding the estimate of said a posteriori odds using a parameter minimizing the value of the function for determination of said score.

15. The speech recognition method as recited in claim 12, wherein
said first step includes the step of representing a classification error rate and a calculation amount as a predetermined function and finding the estimate of said a posteriori odds using a parameter minimizing the value of the function for determination of said score.

16. The speech recognition method as recited in claim 12, wherein
said first step includes the step of representing a classification error rate as a predetermined function and finding the estimate of said a posteriori odds using a parameter minimizing the value of the function for determination of said score and pruning of candidates of said partial patterns.

17. The speech recognition method as recited in claim 12, wherein
said first step includes the step of representing a classification error rate and a calculation amount as a predetermined function and finding the estimate of said a posteriori odds using a parameter minimizing the value of the function for determination of said score and pruning of candidates of said partial patterns.

18. The speech recognition method as recited in claim 11, wherein
said first step includes the step of finding the estimate of said a posteriori odds using a parameter maximizing likelihood of the estimate of the a posteriori odds for determination of said score.

19. The speech recognition method as recited in claim 11, wherein
said first step includes the step of representing a classification error rate as a predetermined function and finding the estimate of said a posteriori odds using a parameter minimizing the value of the function for determination of said score.

20. The speech recognition method as recited in claim 11, wherein
said first step includes the step of representing a classification error rate and a calculation amount as a predetermined function and finding the estimate of said a posteriori odds using a parameter minimizing the value of the function for determination of said score.

21. A speech recognition apparatus for classifying a time series speech pattern representative of a physical activity or phenomenon to one of predetermined classes each indicating a combination of one or more predetermined subclasses, comprising:
score determination means for determining a plurality of partial scores each indicating an estimate of logarithm of a posteriori odds that one of partial patterns of said speech pattern is classified to one of said subclasses;
accumulated score determination means for determining accumulated scores each indicating summation of one or more of said partial scores; and
classification means for classifying said speech pattern into one of said predetermined classes based on said determined accumulated scores, wherein
scores of any possible partial patterns are used, and
the partial patterns are not first isolated.

22. The speech recognition apparatus as recited in claim 21, further comprising:
pruning means for pruning candidates of said partial patterns for determination of said accumulated score or classification of said speech pattern.

23. The speech recognition apparatus as recited in claim 22, further comprising:

optimization means for optimizing the estimate of said a posteriori odds using a parameter maximizing likelihood of the estimated a posteriori odds for determination of said score.

24. The speech recognition apparatus as recited in claim 22, further comprising:

optimization means for representing a classification error rate as a predetermined function and optimizing the estimate of said a posteriori odds using a parameter minimizing the value of the function for determination of said score.

25. The speech recognition apparatus as recited in claim 22, further comprising:

optimization means for representing a classification error rate and a calculation amount as a predetermined function and optimizing the estimate of said a posteriori odds using a parameter minimizing the value of the function for determination of said score.

26. The speech recognition apparatus as recited in claim 22, further comprising:

optimization means for representing a classification error rate as a predetermined function and optimizing the estimate of said a posteriori odds using a parameter minimizing the value of the function for determination of said score and pruning of candidates of said partial patterns.

27. The speech recognition apparatus as recited in claim 22, further comprising:

optimization means for representing a classification error rate and a calculation amount as a predetermined function and optimizing the estimate of said a posteriori odds using a parameter minimizing the value of the function for determination of said score and pruning of candidates of said partial patterns.

28. The speech recognition apparatus as recited in claim 21, further comprising:

optimization means for optimizing the estimate of said a posteriori odds using a parameter maximizing likelihood of the estimated a posteriori odds for determination of said score.

29. The speech recognition apparatus as recited in claim 21, further comprising:

optimization means for representing a classification error rate as a predetermined function and optimizing the estimate of said a posteriori odds using a parameter minimizing the value of the function for determination of said score.

30. The speech recognition apparatus as recited in claim 21, further comprising:

optimization means for representing a classification error rate and a calculation amount as a predetermined function and maximizing the estimate of said a posteriori odds using a parameter minimizing the value of the function for determination of said score.

* * * * *